United States Patent [19]

Pajgrt et al.

[11] Patent Number: 4,509,629
[45] Date of Patent: Apr. 9, 1985

[54] PLURAL MOTOR PLURAL CLUTCH WITH WORM DRIVE

[75] Inventors: Jan Pajgrt; Jan Bezdicek; Jiri Novak, all of Brno, Czechoslovakia

[73] Assignee: ZVS Vyzkumnevyvojovy Ustav, koncernova ucelova organizace, Brno, Czechoslovakia

[21] Appl. No.: 450,122

[22] Filed: Dec. 15, 1982

[30] Foreign Application Priority Data

Dec. 16, 1981 [CS] Czechoslovakia ............... 9365-81

[51] Int. Cl.³ .............................................. B60K 41/28
[52] U.S. Cl. ............................ 192/0.098; 192/48.91; 192/84 AA; 74/665 L
[58] Field of Search ............... 192/18 B, 12 D, 0.098, 192/48.91, 0.096, 48.2, 48.9, 84 AA; 74/661, 665 L, 665 G, 665 D, 425, 411.5; 310/76

[56] References Cited

U.S. PATENT DOCUMENTS

| 4,223,770 | 9/1980 | Kranz | 192/0.098 |
| 4,315,439 | 2/1982 | Grachtrup | 74/661 |
| 4,429,773 | 2/1984 | Dohi et al. | 192/18 B |

Primary Examiner—George H. Krizmanich

[57] ABSTRACT

Clutch mechanism, particularly for looms. The mechanism has a housing, in which a pair of opposed electromagnets are stationarily mounted, between which there is arranged a friction disc mounted axially displaceably on a driven shaft. A rotor, fixedly connected to a control shaft disposed coaxially of the driven shaft, is disposed between one electromagnet and the friction disc for selective driving engagement therewith.

5 Claims, 1 Drawing Figure

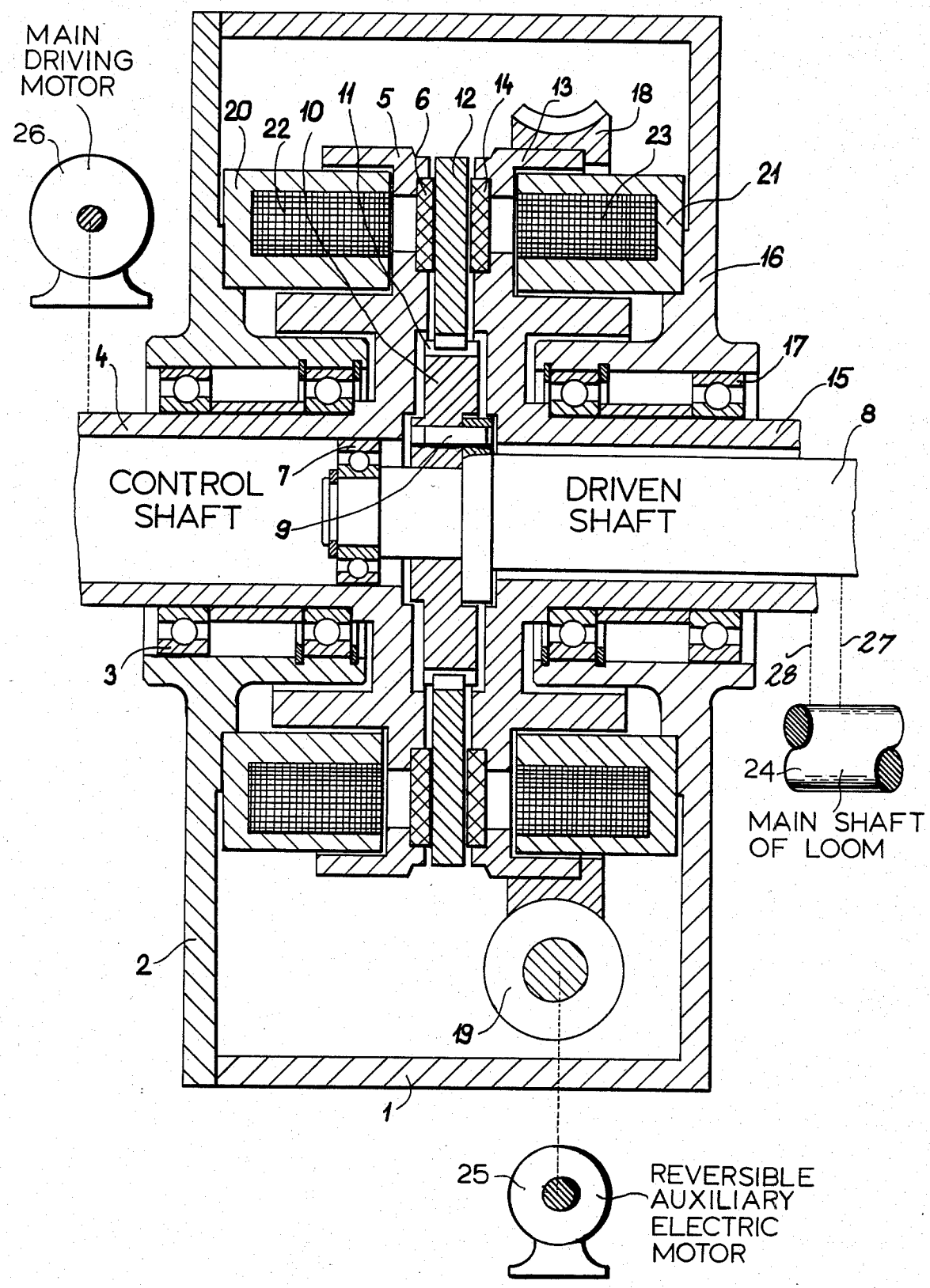

PLURAL MOTOR PLURAL CLUTCH WITH WORM DRIVE

The present invention relates to a clutch mechanism, particularly for looms. Such mechanism has a housing inside which a pair of electromagnets are fixedly mounted with a friction disc arranged therebetween and mounted displaceably on an output shaft, a rotor with a friction lining for contact with the friction disc being arranged between one of the electromagnets and said friction disc, said rotor being fixed on a control shaft.

A clutch mechanism to be used particularly with jet looms is known, in which said mechanism is arranged between a driving electric motor and the main shaft of the loom. This clutch mechanism comprises a pair of annular electromagnets, between which a friction disc is mounted axially displaceably on the driven shaft of the clutch mechanism, said shaft being either connected to the main shaft of the loom, or itself forming the main shaft. The electromagnets are fixed to the housing of the clutch mechanism and to its lid or cover. Between one of the electromagnets and the friction disc there is arranged a first rotor which is fixed to the control shaft and is provided with an annular friction lining for selective engagement with the friction disc. A further annular friction lining, fixed to the other electromagnet, is also intended for contact with the friction disc.

Upon starting the main, driving electric motor, rotary motion is imparted to the control shaft of the clutch mechanism, together with the rotor provided with a friction lining fixedly mounted upon the control shaft. Upon feeding current to the winding of the electromagnet which is associated with the rotor mounted upon the control shaft, the friction disc is attracted to the friction lining of such rotor, and thus its torque is transferred to the driven shaft and from it to the main shaft of the loom. The loom is stopped, for whatever reason, by switching off the electromagnet, and by simultaneously feeding current to the winding of the other electromagnet, which attracts the friction disc to its friction lining and thus brakes the rotary motion of the main shaft of the loom.

The known clutch mechanism as described above makes possible, when using a common asynchronous electric motor, only a full speed forward or a full reverse speed motion of the main shaft of the loom.

When it is necessary to overcome a failure in the weaving process, upon which automatic stoppage of the loom takes place, e.g. when searching for an imperfectly inserted or broken weft, or upon warp breakage, or a mechanical failure of the loom, it is necessary to reduce the speed of all mechanisms forming the fabric, both in the forward and in the reverse direction. In order to achieve this object without the necessity of providing special, intricately controlled electric motors, a special electromagnet clutch with an auxiliary electric motor is usually attached to the fabric-forming mechanism of the loom.

The disadvantage of such prior loom construction consists in its relative intricacy by reason of the necessity of using a further electromagnet clutch and further transmission gearings in connection with the auxiliary electric motor.

This disadvantage is mitigated by the clutch mechanism of the present invention, which is particularly adapted for use with looms. Such mechanism includes a housing in which a pair of annular electromagnets are fixedly mounted, between which there is arranged a friction disc mounted for axial displacement on a driven shaft, a rotor with a friction lining being mounted between one of said electromagnets and the friction disc for the purpose of contact with the latter, said rotor being fixedly mounted upon the control shaft. The subject matter according to the present invention consists in that between the other electromagnet and the friction disc, a second rotor is mounted, the second rotor also being provided with a friction lining for contact with the other side of the friction disc, said second rotor being fixedly arranged on a hollow shaft which freely surrounds the driven shaft and is rotatably mounted in the housing of the clutch mechanism. One of said rotor is provided on its circumference with a worm wheel, a worm drivingly connected to an auxiliary electric motor meshing with the worm wheel.

The advantage of the arrangement of the clutch mechanism according to the present invention consists in the simplification of the driving mechanism and in the integration of the function of the known electromagnetic clutch into one assembly, together with the clutch mechanism of the main drive of the loom.

An embodiment in the form of a preferred example of the clutch mechanism according to the present invention is shown in the accompanying drawing, in which:

The single FIGURE of the drawing depicts the clutch mechanism in axial section, elements of the loom and main and auxiliary prime movers connected to the loom and/or the clutch mechanism being shown schematically.

The illustrative clutch mechanism has a housing 1 and a lid or cover 2 therefor. In the cover 2, there is mounted a hollow control shaft 4 in bearings 3. Inside housing 1 there is mounted a first rotor 5, which is provided at its axially inner side with an annular friction lining 6. Rotor 5 is fixedly mounted upon the control shaft 4.

At the axially inner end of control shaft 4 there is disposed a further bearing 7 in which the axially inner end of a driven shaft 8 is mounted. The opposite end of the shaft 8 is mounted in a bearing (not shown) of the loom. The driven shaft 8 is either connected with the main shaft 24 of the loom, as schematically shown in the drawing, or forms such main shaft of the loom itself. Inside housing 1 there is mounted on driven shaft 8, and connected thereto by a series of pins 9 (one shown), a driving disc 10 which is provided about its circumference with a plurality of transverse projections 11, on which there is mounted a friction disc 12. Disc 12 made of ferromagnetic material is arranged parallel with rotor 5, and is axially shiftable relative to driven shaft 8 upon which it is mounted. On the opposite side of friction disc 12 there is arranged a further, second rotor 13 with a further annular friction lining 14. The said second rotor 13 is fixed to a hollow shaft 15, which freely surrounds the driven shaft 8, and is mounted at the rear wall 16 of housing 1 in a system of bearing 17. The opposite end of hollow shaft 15 may be connected, outside the clutch mechanism, to certain parts of the loom, or may be connected to the main shaft of the loom, as schematically shown in the drawing. One of the rotors 5, 13, in the exemplary embodiment shown rotor 13, is provided at its circumference with a worm wheel 18, which is adapted for meshing engagement with a worm 19 connected to a reversible auxiliary electric motor 25, which is schematically shown. The worm wheel and worm, in the exemplary embodiment, form an irreversible drive, that is, the worm can drive the worm wheel but the worm wheel cannot drive the worm. To each of the rotors 5, 13 there is assigned one of the electromagnets 20, 21, such electromagnets having respective windings 22, 23. The first electromagnet 22 is fastened to cover 2 of the housing 1, while the other electromagnet 21 is fastened to the rear or right-hand wall 16 of the housing 1.

The main driving motor 26 is connected to control shaft 4 as schematically shown in the drawing. The driven shaft 8 is connected with the main shaft 24 of the loom, and the hollow shaft 15 is connected to main shaft 24 of the loom, also as shown schematically in the drawing.

The clutch mechanism according to the present invention operates as follows:

By feeding current to the main driving electric motor 26 the control shaft 4 of the clutch mechanism begins to rotate and, together therewith, also the first rotor 5. Upon feeding current to the winding 22 of the first electromagnet 20 associated with the rotor 5, friction disc 12 is attracted to the friction lining 6 of the first rotor 5, and thus is driven therewith. The rotary motion of friction disc 12 is transmitted, by means of the transverse projections 11, to the driving disc 10 and, further therefrom, via the system of pins 9, to the driven shaft 8 of the clutch mechanism. From there, the rotary motion is transmitted to the main shaft 24 of the loom. This interconnection makes it possible to perform the ordinary weaving process.

When a weft failure, a warp failure, or a mechanical failure occurs during weaving, the current supply into the winding 22 of the first electromagnet 20 is interrupted by the action of checking mechanisms (not shown). Simultaneously, current is supplied into winding 23 of the second electromagnet 21, which attracts the friction disc 12 to the friction lining 14 of the second rotor 13, which is secured against rotation by the self-locking of the irreversible drive made up of the worm wheel 18 and the worm 19. Thus the rotary motion of driven shaft 8 of the clutch mechanism is braked and consequently, the main shaft 24 of the loom is also braked.

Upon removing the failure or the weft or warp defect, the the attendant starts the reversible auxiliary electric motor 25 with the worm 19 in the required direction of rotation. Thus a retarded forward or reverse rotation of the worm wheel 18 with the second rotor 13 is obtained. The said rotor 13 with friction lining 14, when the electromagnet 21 associated therewith is switched on, drives friction disc 12 via lining 14, thus driving disc 10 and driven shaft 8 with a retarded forward or reverse motion which is also imparted to the main shaft 24 of the loom. Simultaneously there occurs a coincident rotary motion of the hollow shaft 15 together with all parts of the loom attached to said hollow shaft. When the second electomagnet 21 is switched off, only hollow shaft 15 and, together therewith all moving parts of the loom attached thereto, are given a retarded forward or reverse rotary motion.

The clutch mechanism according to the present invention makes it possible also to transmit a torque from a further driving electric motor (not shown) to hollow shaft 15, the drive of the main shaft 24 of the loom, in such alternative embodiment, being also derived from the driven shaft 8. In this case, the input and the output of the clutch mechanism are disposed on one side thereof. In this arrangement the worm wheel 18 is mounted on the first rotor 5. By feeding current to winding 23 of the second electromagnet 21, friction disc 12 is attracted to the friction lining 14 of the rotating second rotor 13, this imparting rotary motion in the described manner to the driven shaft 8.

If during the weaving process the current supply to the winding 23 of the second electromagnet 21 is interrupted, due to a failure in the weaving process, and simultaneously current is supplied to winding 22 of the first electromagnet 20, the said first electromagnet attracts the friction disc 12 to the friction lining 6 of the first rotor 5, which is secured against rotation due to the self-locking of its worm wheel 18 and the worm 19. Thus the rotary motion of the driven shaft 8 is braked.

This arrangement also makes it possible to perform a retarded rotary motion of control shaft 4 from auxiliary electric motor 25 via worm 19, worm wheel 18, and the first rotor with electromagnet 20 corresponding thereto in switched-off condition. In such case, the control shaft 4 may be connected to certain driven parts of the loom.

The present invention can be applied for driving various machines, particularly looms.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A clutch mechanism adapted for use with looms, comprising a housing, a pair of opposed, coaxially disposed electromagnets stationarily mounted in the housing, a driven shaft disposed coaxial of the electromagnets, a friction disc mounted on the driven shaft between the electromagnets, the friction disc being mounted for axial displacement on the driven shaft, a control shaft mounted coaxially of the driven shaft, a main motor for driving the control shaft, a rotor fixedly connected to the control shaft disposed between one electromagnet and the friction disc for selective driving engagement with the friction disc, a second rotor provided with a frictional surface adapted for selective driving engagement with the other side of the friction disc, said second rotor being disposed between the second electromagnet and the friction disc, said second rotor being fixed to a hollow shaft which freely surrounds the driven shaft and is rotatably mounted in the housing of the clutch mechanism, one of said first and second rotors being drivingly connected with a worm wheel, a worm having meshing driving engagement with the worm wheel, and an auxiliary prime mover drivingly connected with the worm.

2. The combination according to claim 1, wherein the auxiliary prime mover is reversible, and the drive through the worm and worm wheel can proceed only in the direction from the worm to the worm wheel.

3. The combination according to claim 2, comprising a main shaft of a loom, means connecting the main shaft of the loom to the driven shaft, and means connecting the main shaft of the loom to the hollow shaft which surrounds the driven shaft.

4. The combination according to claim 3, wherein the worm wheel is drivingly connected with the second rotor.

5. The combination according to claim 4, wherein the worm wheel is directly mounted upon the second rotor.

* * * * *